(12) United States Patent
Wang et al.

(10) Patent No.: US 9,088,928 B2
(45) Date of Patent: Jul. 21, 2015

(54) LOCAL NETWORK ACCESS CONTROL VIA SMALL WIRELESS CELLS IN WIRELESS NETWORKS

(75) Inventors: Zhibi Wang, Woodridge, IL (US); Michael Dolan, Bolingbrook, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 160 days.

(21) Appl. No.: 13/221,318

(22) Filed: Aug. 30, 2011

(65) Prior Publication Data
US 2013/0051379 A1 Feb. 28, 2013

(51) Int. Cl.
H04L 12/28 (2006.01)
H04W 48/02 (2009.01)
H04W 12/08 (2009.01)

(52) U.S. Cl.
CPC .............. *H04W 48/02* (2013.01); *H04W 12/08* (2013.01)

(58) Field of Classification Search
USPC ......... 370/338, 335, 342, 343, 332, 333, 437, 370/441, 447; 455/412, 422.1, 432.1, 455/432.3, 434, 435.1, 435.2, 435.3, 436, 455/440, 444, 450, 452.1, 452.2
See application file for complete search history.

(56) References Cited

U.S. PATENT DOCUMENTS

2010/0272013 A1* 10/2010 Horn et al. .................... 370/328
2010/0284386 A1* 11/2010 Ulupinar et al. ............. 370/338
2011/0103310 A1* 5/2011 Stojanovski et al. ......... 370/328
2011/0300851 A1* 12/2011 Krishnaswamy et al. . 455/422.1
2012/0002637 A1* 1/2012 Adjakple et al. ............. 370/331
2012/0076121 A1* 3/2012 Choi et al. .................... 370/338

FOREIGN PATENT DOCUMENTS

WO WO 2011/021875 2/2011

OTHER PUBLICATIONS

Horn, Gavin, "3GPP Femtocells: Architecture and Protocols", Sep. 2010, Qualcomm Inc., San Diego, CA.
International Search Report and Written Opinion of the International Searching Authority PCT/ISA/220 for International Application No. PCT/US2012/049923 dated Oct. 24, 2012.
3rd Generation Partnership Project; Technical Specification Group Services and System Aspects; Service Requirements for Home NodeBs and Home eNodeBs (Release 10), 3GPP TS 22.220, vol. 10.1.0, 2009, pp. 1-23.
International Preliminary Report on Patentability and Written Opinion for International Application No. PCT/US2012/049923 dated Mar. 13, 2014.

* cited by examiner

*Primary Examiner* — Zewdu A Beyen
(74) *Attorney, Agent, or Firm* — Harness, Dickey & Pierce, P.L.C.

(57) ABSTRACT

In a method for controlling access to a local network via a small wireless cell in a wireless network, local network access control information is received at the small wireless cell, and the small wireless cell controls access to the local network by the user based on the local network access control information. The access control information is indicative of whether a user is permitted to access the local network through the small wireless cell, and is independent of wireless network access control information indicative of whether the user is permitted to access the wireless network.

19 Claims, 8 Drawing Sheets

| User A Identity | General Access Permissions | Parameter j | Parameter k | ... | Parameter n |

| User B Identity | General Access Permissions | Parameter j | Parameter k | ... | Parameter n |

| User C Identity | General Access Permissions | Parameter j | Parameter k | ... | Parameter n |

. . .
. . .
. . .

| User X Identity | General Access Permissions | Parameter j | Parameter k | ... | Parameter n |

FIG. 4A (CONVENTIONAL ART)

| User A Identity | General Access Permissions | Parameter j | ... | Parameter n | LIPA Access Permission | LIPA Timeout | RIPA Access Permission | RIPA Timeout | Other Access Permission |

| User B Identity | General Access Permissions | Parameter j | ... | Parameter n | LIPA Access Permission | LIPA Timeout | RIPA Access Permission | RIPA Timeout | Other Access Permission |

| User C Identity | General Access Permissions | Parameter j | ... | Parameter n | LIPA Access Permission | LIPA Timeout | RIPA Access Permission | RIPA Timeout | Other Access Permission |

. . . . .
. . . . .

| User X Identity | General Access Permissions | Parameter j | ... | Parameter n | LIPA Access Permission | LIPA Timeout | RIPA Access Permission | RIPA Timeout | Other Access Permission |

FIG. 4B

| User A Identity |
|---|

FIG. 7A (CONVENTIONAL ART)

| User A Identity |
|---|

| LIPA Access Permission | LIPA Timeout | RIPA Access Permission | RIPA Timeout | Other Access Permission |
|---|---|---|---|---|

FIG. 7B

LOCAL NETWORK ACCESS CONTROL VIA SMALL WIRELESS CELLS IN WIRELESS NETWORKS

BACKGROUND OF THE INVENTION

A small wireless cell, such as a femto cell, typically covers a smaller geographic area or subscriber constituency than a conventional macro cell. In one example, a small wireless cell typically provides radio coverage in a geographical area such as a building or home. By contrast, a conventional macro cell typically provides radio coverage in a larger area such as an entire city or town.

In the current $3^{rd}$ Generation Partnership Project (3GPP) standards, access to a closed, small wireless cell within a wireless network is controlled according to a Closed Subscriber Group (CSG) list associated with each user. A CSG list is a list of CSGs to which a particular user belongs. A CSG is a term used to describe a limited set of users with connectivity access to a given wireless cell, such as a femto cell or the like.

In the current $3^{rd}$ Generation Partnership Project 2 (3GPP2) standards, access to a closed, small wireless cell within a wireless network is controlled according to an Access Control List (ACL) associated with the small wireless cell. An ACL is a list of users that are permitted to utilize resources of a small wireless cell.

Access control mechanisms described in both the 3GPP and 3GPP2 standards only control whether a user is permitted to access the target cell. There is no conventional mechanism to allow the user to access an operator's internet protocol (IP) network, but prevent local IP access (LIPA) to IP-based services and devices on a user's/owner's local network to which the small wireless cell is connected. LIPA is a mechanism that allows an IP-enabled user included in an ACL or CSG to access such a local network as well as an operator's core network and the Internet directly through the air interface of a small wireless cell, such as a femto cell. There is also no conventional mechanism to allow a user to access an operator's internet protocol (IP) network, but prevent remote IP access (RIPA). RIPA is a mechanism enabling users served by a macro cell and included in an ACL or CSG for the small wireless cell to access IP-based services and devices on the local network.

Moreover, conventional control mechanisms are implemented at a network management entity, such as an access point management system. Access control is not performed at small wireless cells, nor do small wireless cells receive access control information necessary to perform LIPA and/or RIPA.

SUMMARY OF THE INVENTION

At least some example embodiments provide methods for controlling local Internet Protocol (IP) access (LIPA) and remote IP access (RIPA) access for a hosting party of a small wireless cell (e.g., a femto cell, micro cell, pico cell, metro cell, nano cell, etc.). Example embodiments may not only control the LIPA and/or RIPA access for the hosting party of a small wireless cell, but also secure sensitive information and/or resources on the local IP network from a non-designated user.

At least one example embodiment provides a method for controlling access to a local network via a small wireless cell in a wireless network. According to at least this example embodiment, the method includes: receiving, at the small wireless cell, local network access control information indicative of whether a user is permitted to access the local network through the small wireless cell, the local network access control information being independent of wireless network access control information indicative of whether the user is permitted to access the wireless network; and controlling, by the small wireless cell, access to the local network by the user based on the local network access control information.

At least one other example embodiment provides a method for controlling access to a local network via a small wireless cell in a wireless network. According to at least this example embodiment, the method includes: first determining, at a small wireless cell, whether to permit a user to access the wireless network through the small wireless cell based on access control information associated with the user; second determining, at the small wireless cell, whether to permit the user to access the local network via the small wireless cell based on the access control information associated with the user if the first determining step determines that the user is permitted to access the wireless network through the small wireless cell; and controlling, at the small wireless cell, access to the local network by the user based on the second determining step.

At least one other example embodiment provides a method for controlling access to a local network via a small wireless cell in a wireless network. According to at least this example embodiment, the method includes: determining, at the small wireless cell, whether to permit a user to access the local network via the small wireless cell based on local network access control information indicative of whether the user is permitted to access the local network through the small wireless cell, the local network access control information being independent of wireless network access control information indicative of whether the user is permitted to access the wireless network; and controlling, at the small wireless cell, access to the local network by the user based on the determining step.

At least one other example embodiment provides a small wireless cell in a wireless network. According to at least this example embodiment, the small wireless cell is configured to: receive local network access control information indicative of whether a user is permitted to access a local network through the small wireless cell, the local network access control information being independent of wireless network access control information indicative of whether the user is permitted to access a wireless network; and control access to the local network by the user based on the local network access control information.

At least one other example embodiment provides a small wireless cell in a wireless network. According to at least this example embodiment, the small wireless cell the small wireless cell being configured to: determine whether to permit a user to access a local network via the small wireless cell based on local network access control information indicative of whether the user is permitted to access the local network through the small wireless cell, the local network access control information being independent of wireless network access control information indicative of whether the user is permitted to access the wireless network; and control access to the local network by the user based on whether the user is permitted to access the local network via the small wireless cell.

At least one other example embodiment provides a small wireless cell in a wireless network. According to at least this example embodiment, the small wireless cell is configured to: determine whether to permit a user to access the wireless network through the small wireless cell based on access control information associated with the user; determine whether to permit the user to access the local network via the small wireless cell based on the access control information associated with the user if the user is permitted to access the wireless network through the small wireless cell; and control access to the local network by the user based on whether the user is permitted to access the local network.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIG. 4A shows example content of a conventional Access Control List (ACL);

FIG. 4B shows example content of an ACL including access control information according to an example embodiment;

FIG. 7A shows example content of a conventional CSG list at a small wireless cell; and FIG. 7B shows example content of a CSG list at a small wireless cell including access control information according to an example embodiment.

DETAILED DESCRIPTION OF THE EMBODIMENTS

Figure 1:
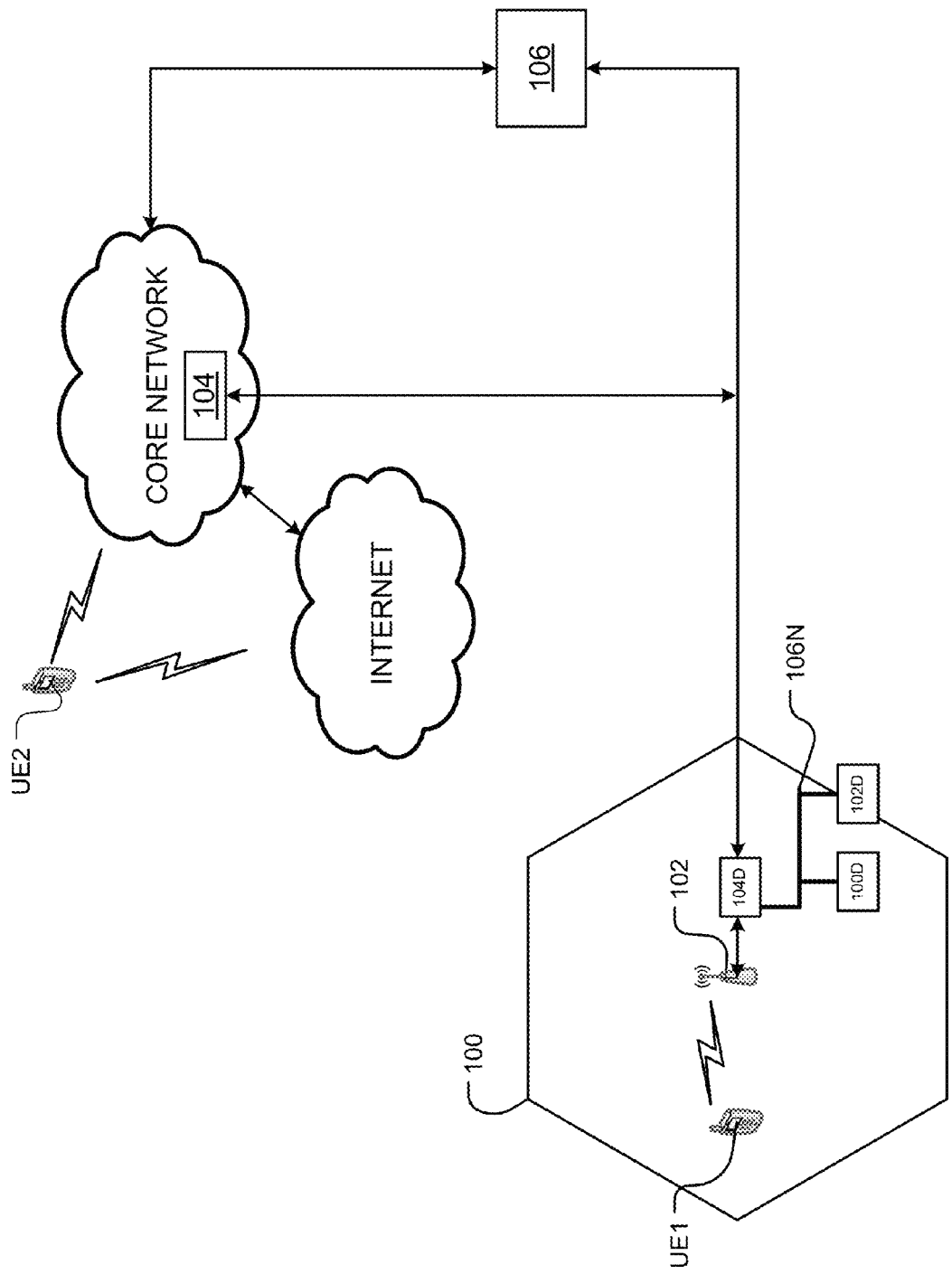
FIG. 1 illustrates a portion of a radio access network (RAN)

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, may be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/ acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements (e.g., small wireless cells, small wireless access points, femto access points, etc.). Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments may be utilized in conjunction with RANs such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); ultra mobile broadband (UMB); and $3^{rd}$ Generation Partnership Project Long Term Evolution (3GPP LTE).

FIG. 1 illustrates a portion of a radio access network (RAN) in which example embodiments may be implemented.

Referring to FIG. 1, the RAN includes a small wireless cell 102, which provides radio frequency (RF) coverage within a relatively small geographic area 100. As used herein, the phrase "small wireless cell" may refer to any relatively small wireless cell or access point, such as a femto cell, femto access point (or base station), pico cell, pico access point (or base station), micro cell, micro access point (or base station), metro cell, metro access point (or base station), nano cell, nano access point (or base station), etc.

The small wireless cell 102 is connected to a local network 106N via a broadband router 104D. In the example shown in FIG. 1, the local network 106N includes locally connected devices 100D and services 102D. The locally connected devices 100D and services 102D may include printers, computers, set-top boxes, Internet-enabled televisions, security systems, home appliances, HVAC systems, other small wireless access points, etc. The small wireless cell 102 is also connected to an access point management system (APMS) 106 through the broadband router 104D and one or more packet or circuit switched networks (not shown). The APMS 106 may be, for example, a femto management system, and is described in more detail later.

In addition to the functionality discussed herein, the APMS 106 is analogous to and has the same well-known functionality as a radio access network (RAN) control node in a macro cellular system. Because this conventional functionality of RAN control nodes and the APMS 106 is well-known, a detailed discussion is omitted.

The APMS 106 is connected only to the small wireless cell 102 in FIG. 1. However, the APMS 106 may be connected to a plurality of small wireless cells. Moreover, the APMS 106 may be implemented at the small wireless cell 102, or another small wireless cell (not shown).

As discussed herein, a local network refers to a home, office, or campus-based local area network (LAN), or other computer network that connects computers and/or other devices in a relatively limited geographical area such as a home, school, computer laboratory, office, etc. By contrast, as discussed herein, a wireless telecommunications network, wireless network or mobile network refers to one or more radio access networks including macro and/or small wireless cells providing radio access to user's over a larger geographical area.

Referring still to FIG. 1, a first user UE1 is located within the coverage area 100 of the small wireless cell 102. If the first user UE1 is granted/permitted local Internet Protocol (IP) access (LIPA) to the small wireless cell 102, the first user UE1 (or other IP-enabled device) is able to access the local network 106N as well as the operator's core network and the Internet directly through the air interface of the small wireless cell 102. A method for controlling LIPA for the first user UE1 is discussed in more detail later. According to at least some example embodiments, access to the local network 106N includes access to IP-based devices 100D and/or services 102D on the local network 106N.

The second user UE2 is connected to the core network through the air interface of a macro cell (not shown). If the second user UE2 is granted/permitted remote IP access (RIPA) to the small wireless cell 102, the second user UE2 is able to access IP-based services and devices on the local network 106N. A method for controlling RIPA for the second user UE2 is discussed in more detail below.

Each of the first user UE1 and the second user UE2 is a user equipment (UE), such as, mobile ("cellular") telephones, portable computers, pocket computers, hand-held computers, personal digital assistants (PDAs), car-mounted mobile devices, other IP-enabled devices, or the like, which communicate voice and/or data with the RAN. Throughout this disclosure, the term "users," "user equipments," "UEs," "mobiles," "mobile stations," etc. may be used interchangeably.

For example purposes, FIG. 1 shows only a single APMS 106, a single small wireless cell 102 and two users UE1 and UE2. However, it will be understood that RANs may include any number of access point management systems and/or small wireless cells, which serve any number of users.

Still referring to FIG. 1, the small wireless cell 102 is also connected to an authentication, authorization and accounting (AAA) server 104 through the broadband router 104D and one or more packet and/or circuit switched networks. As is known, an AAA server is a network entity in an operator's core network that provides IP functionality to support authentication, authorization and accounting. Because conventional functionality of an AAA server is known, a detailed discussion is omitted.

As mentioned above, conventional mechanisms for controlling access to a closed, small wireless cell within a wireless network only control whether a user is permitted to access the target wireless cell. There is no conventional mechanism to allow the user to access an operator's core network, but prevent LIPA and/or RIPA to the local network on which the small wireless cell resides.

Moreover, conventional control mechanisms are implemented at a network management entity, such as APMS 106 shown in FIG. 1. Access control is not performed at small wireless cells, nor do small wireless cells receive access control information based on which the access control is performed.

Furthermore, there is currently no solution to control LIPA for a small wireless cell. There is also no mechanism for a small wireless cell owner to provision access control information to the small wireless cell, and no mechanism is provided to limit RIPA for a user.

At least one example embodiment provides a method for controlling access to a local network via a small wireless cell in a wireless network. In this example, the small wireless cell receives local network access control information indicative of whether a user is permitted to access the local network through the small wireless cell, and controls access to the local network by the user based on the local network access control information. The local network access control information may include LIPA control information and RIPA control information, and is independent of wireless network access control information (e.g., general access permissions) indicative of whether the user is permitted to access the wireless network. The LIPA control information is indicative of whether a user is permitted to access the IP-based services and/or devices locally connected to the local network. Similarly, the RIPA control information is indicative of whether a user is permitted to remotely access IP-based services and/or devices locally connected to the local network.

In accordance with at least one example embodiment, the LIPA control information may be in the form of two fields within an ACL or CSG list stored in a memory (not shown) at the small wireless cell 102. The two fields are referred to herein as the "LIPA Access Permission" field and the "LIPA Timeout" field. The LIPA Access Permission field includes local access control information indicating whether a particular user is permitted LIPA at a particular small wireless cell. The LIPA Timeout field includes time information indicative of a limit on the time a user's LIPA authorization is valid. The time information may be an absolute time or a delta (change) from the time when LIPA is granted. For example, the time information may identify a date and time after which a user's LIPA to the small wireless cell is no longer valid. Alternatively, the time information may include a finite period of time during which the user is authorized LIPA to the small wireless cell after being granted LIPA.

The time information for a user may be infinite for a regular user, such as the owner of the small wireless cell. In this case, the user's LIPA to the local network may be permanent. Alternatively, the time information for a temporary user, such as a visitor, whose LIPA needs to be controlled may be set to expire after a given period of time or at a set date, time, etc.

If the LIPA Access Permission field is on (e.g., the LIPA Access Permission is set to a given value) for a particular user, then the user is granted LIPA rights within the LIPA Timeout time period.

The LIPA information including the LIPA Access Permission field and the LIPA Timeout field includes access control information that is independent of a user's general access permissions as well as other access permissions for the user.

The RIPA control information may also be in the form of two new fields within an ACL or CSG list at a small wireless cell. The two new fields may be referred to as the "RIPA Access Permission" field and the "RIPA Timeout" field. The RIPA Access Permission field includes remote access control information indicating whether a particular user is permitted RIPA at a small wireless cell. The RIPA Timeout field includes time information indicative of a limit on the time a user's RIPA authorization is valid. The time information may be an absolute time or a delta (change) from the time when RIPA is granted. For example, the time information may identify a date and time after which a user's RIPA to the small wireless cell is no longer valid. Alternatively, the time information may include a finite period of time during which the user is authorized RIPA to the small wireless cell after being granted RIPA.

As with the LIPA time information, the RIPA time information for a user may be infinite for a regular user, such as the owner of the small wireless cell. In this case, the user's RIPA to the local network is permanent. Alternatively, the time information for a temporary user, such as a visitor, whose RIPA needs to be controlled may be set to expire after a given period of time or at a set date, time, etc.

If the RIPA Access Permission field is on (e.g., the RIPA Access Permission field is set to a given value) for a particular user, then the user is granted RIPA rights within the time period set forth in the RIPA Timeout period.

The RIPA information including the RIPA Access Permission field and the RIPA Timeout field also includes access control information that is independent of a user's general access permissions as well as other access permissions for the user.

For a CSG based mechanism used in connection with the current 3GPP standard, the Home Location Register/Home Subscriber Server (HLR/HSS) is provisioned a CSG list for each user (or subscriber). According to at least one example embodiment, the LIPA Access Permission, LIPA Timeout, RIPA Access Permission and RIPA Timeout fields are added to each CSG entry in the CSG list. When the CSG list along with newly added parameters are sent to a control enforcement point (e.g., SGSN/MSC/MME), LIPA and RIPA control for users is possible.

Figure 2:
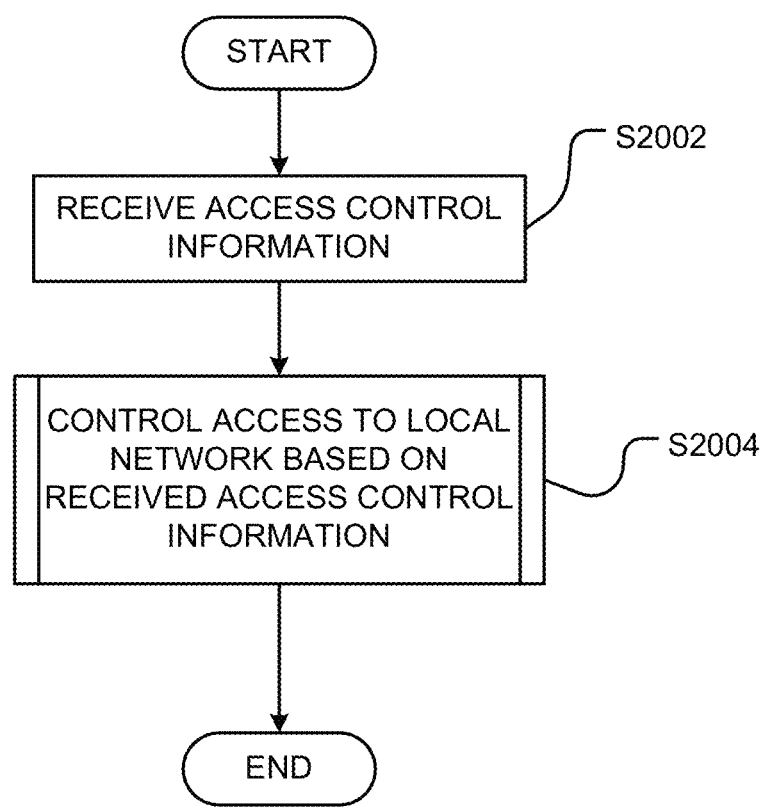
FIG. 2 is a flow chart illustrating an example embodiment of a method for controlling user access to a local network.

FIG. 2 is a flow chart illustrating an example embodiment of a method for controlling user access to a local network via a small wireless cell. The method shown in FIG. 2 may be performed at the small wireless cell 102 shown in FIG. 1 to control LIPA and/or RIPA to the local network 106N by the first and second users UE1 and UE2. For example purposes, the method shown in FIG. 2 will be described as performed by the small wireless cell 102.

Moreover, example embodiments will be discussed with regard to LIPA control for the first user UE1, and RIPA control for the second user UE2. It should be understood, however, that each of the first user UE1 and the second user UE2 may have associated LIPA and RIPA control information. And, it should also be understood that the small wireless cell 102 may control LIPA and RIPA for each of the first and second users UE1 and UE2.

Referring to FIG. 2, at step S2002, the small wireless cell 102 receives access control information from a network entity such as the APMS 106, the AAA server 104 or another trusted network entity. The access control information may be included in an ACL and/or a CSG list. The ACL and/or the CSG list may be stored in a memory (not shown) at the small wireless cell 102.

The access control information is indicative of whether the first user UE1 is permitted to attach to the small wireless cell 102 and access the wireless network (e.g., the core network including a network operator's macro cell system) directly through the air interface of the small wireless cell 102. In this case, the first user UE1 is served by the small wireless cell 102. The access control information is also indicative of whether the first user UE1 is permitted to access the local network 106N directly through the air interface of the small wireless cell 102. Further, the access control information is indicative of whether the second user UE2 is permitted to remotely access the local network 106N through the small wireless cell 102.

More specifically, in accordance with at least one example embodiment, the access control information received at the small wireless cell 102 includes LIPA control information and RIPA control information. The LIPA control information defines a user's LIPA access rights with regard to the local network 106N, and the RIPA control information defines a user's RIPA access rights with regard to the local network 106N.

In this example embodiment, the LIPA control information is included in the LIPA Access Permission field and the LIPA Timeout field within an ACL (for 3GPP2) or CSG list (for 3GPP) at the small wireless cell 102. Similarly, the RIPA control information is included in the RIPA Access Permission field and the RIPA Timeout field within the ACL or the CSG list at the small wireless cell 102.

Example ACLs and CSG lists according to at least some example embodiments will be discussed in more detail below with regard to FIGS. 4A-7B.

Referring back to FIG. 2, at step S2004, the small wireless cell 102 controls access to the local network 106N by the first user UE1 and the second user UE2 based on the received access control information. In so doing, the small wireless cell 102 is capable of controlling LIPA and/or RIPA for first and second users UE1 and UE2. Examples of controlling LIPA and RIPA at step S2004 in FIG. 2 will be discussed in more detail below with regard to FIGS. 3A and 3B.

Figure 3A:
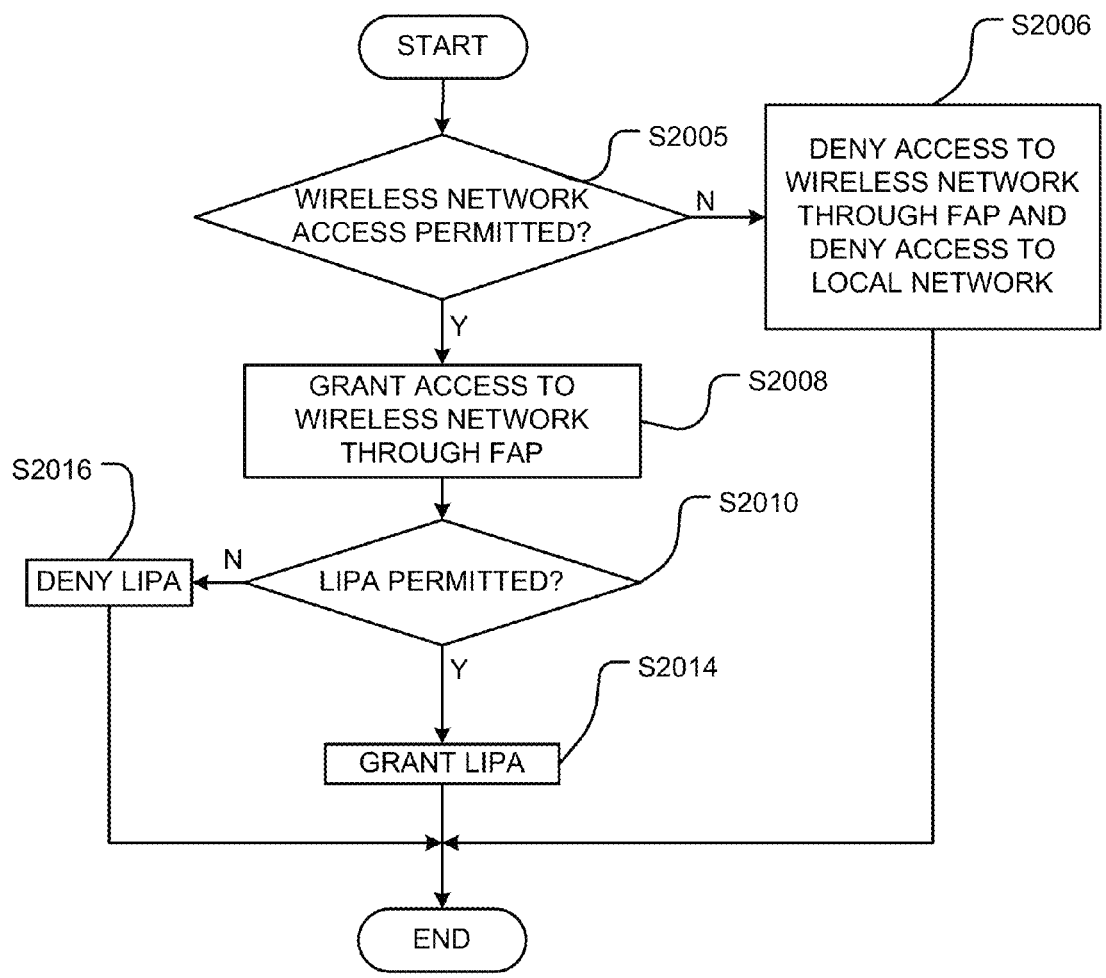
FIG. 3A is a flow chart illustrating an example embodiment of a method for controlling local internet protocol (IP) access (LIPA)
Figure 3B:
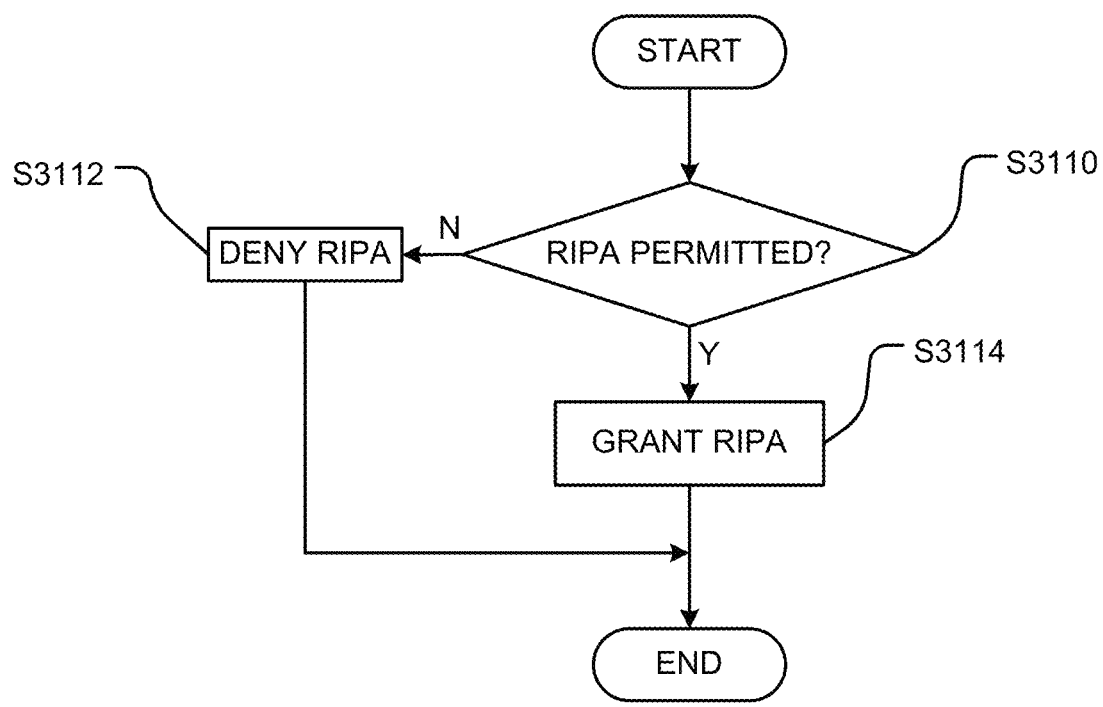
FIG. 3B is a flow chart illustrating an example embodiment of a method for controlling remote IP access (RIPA)

FIG. 3A shows an example embodiment for controlling LIPA for the first user UE1 in FIG. 1, whereas FIG. 3B shows an example embodiment for controlling RIPA for the second user UE2 in FIG. 1.

Referring to FIG. 3A, at step S2005, the small wireless cell 102 determines whether the first user UE1 is permitted to access the wireless network directly through the air interface of the small wireless cell 102 based on the received access control information. Permission to access the wireless network directly through the air interface of the small wireless cell 102 is determined according to the rules of the specific air interface. For example, permission to access the wireless network directly through the air interface of the small wireless cell 102 may be determined according to UMTS standards, HRPD standards, etc., using identifiers, procedures, and authentication and authorization mechanisms defined for that particular air interface. Because methods for obtaining such permission is known in the art, a detailed discussion is omitted.

Referring back to FIG. 3A, if the small wireless cell 102 determines that the first user UE1 is not permitted to access the wireless network directly through the air interface of the small wireless cell 102 at step S2005, then the small wireless cell 102 denies the first user UE1 access to the wireless network and LIPA to the local network 106N directly through the air interface of the small wireless cell 102 at step S2006.

Returning to step S2005, if the small wireless cell 102 determines that the first user UE1 is permitted to access the wireless network directly through the air interface of the small wireless cell 102, then the small wireless cell 102 grants the first user UE1 permission to do so at step S2008. In so doing, the small wireless cell 102 allocates wireless resources to the first user UE1.

At step S2010, the small wireless cell 102 then determines whether the first user UE1 is permitted LIPA to the local network 106N through the small wireless cell 102. The small wireless cell 102 determines whether the first user UE1 is permitted LIPA to the local network 106N based on the received access control information from the APMS 106, AAA server 104, or other trusted functional entity.

In one example, the small wireless cell 102 may examine or check the LIPA Access Permission and LIPA Timeout fields in the ACL (or alternatively the CSG) stored at the small wireless cell 102 to determine whether the first user UE1 is permitted LIPA to the local network 106N. If the LIPA Access Permission and LIPA Timeout fields for the first user UE1 are on, then the small wireless cell 102 determines that the first user UE1 is permitted to access the local network 106N via the small wireless cell 102. The LIPA Access Permission field may be considered "on" when the field is set to a given value indicating that the first user UE1 is permitted LIPA to the local network 106N. The given value may be a value between 1 and 10, which is set by a network operator or owner of the small wireless cell. The LIPA Timeout field may be considered "on" if the field is set to a time period, duration or interval, which has not yet expired or a particular time that has not yet been reached.

If the LIPA Access Permission and LIPA Timeout fields are off, then the small wireless cell 102 determines that the first user UE1 is not permitted LIPA to the local network 106N via the small wireless cell 102. The LIPA Access Permission field may be considered "off" when the field is set to a value other than the value indicating that the first user UE1 is permitted to access the local network 106N. The LIPA Timeout field may be considered "off" if the field is set to a time duration, which has expired or a particular time in the past.

The access control information including LIPA permission information may be provided to the small wireless cell 102 at initialization or boot-up of the small wireless cell 102. Alternatively, the access control information may be provided to the small wireless cell 102 when the first user UE1 receives permission to access the wireless network directly through the air interface of the small wireless cell 102 in step S2005. In another alternative, the small wireless cell 102 may query and obtain the access control information for the first user UE1 in response to a LIPA request from the first user UE1.

Returning to FIG. 3A, if the small wireless cell 102 determines that the first user UE1 is permitted LIPA to the local network 106N at step S2010, then the small wireless cell 102 grants the first user UE1 permission to do so at step S2014.

Returning to step S2010, if the small wireless cell 102 determines that the first user UE1 is not permitted LIPA to the local network 106N through the small wireless cell 102, then the small wireless cell 102 denies the first user UE1 permission to do so at step S2012.

The small wireless cell 102 authorizes LIPA to the local network 106N by the first user UE1 for a time determined based on the information contained in the LIPA Timeout field. If the LIPA Timeout field includes an absolute time, then the first user UE1 is authorized LIPA to the local network until the time identified in the LIPA Timeout field is reached. Alternatively, if the LIPA Timeout field includes a time interval or time period, then the first user UE1 is authorized LIPA to the local network 106N until the time period or time interval expires.

Referring now to FIG. 3B, at step S3110, the small wireless cell 102 determines whether the second user UE2 is permitted RIPA to the local network 106N through the small wireless cell 102. In one example, the small wireless cell 102 determines whether the second user UE2 is permitted RIPA to the local network 106N based on the access control information received from the APMS 106, AAA server 104, or other trusted functional entity.

For example, the small wireless cell 102 may examine or check the RIPA Access Permission and RIPA Timeout fields in the ACL (or alternatively the CSG) stored at the small wireless cell 102 to determine whether the second user UE2 is permitted RIPA to the local network 106N. If the RIPA Access Permission and RIPA Timeout fields for the second user UE2 are on, then the small wireless cell 102 determines that the second user UE2 is permitted to access the local network 106N via the small wireless cell 102. The RIPA Access Permission field may be considered "on" when the field is set to a given value indicating that the second user UE2 is permitted to remotely access the local network 106N. The given value may be, for example, a value between 1 and 10, which is set by a network operator or owner of the small wireless cell 102. The RIPA Timeout field may be considered "on" if the field is set to a time duration, which has not yet expired or a particular time that has not yet been reached.

If the RIPA Access Permission and RIPA Timeout fields are off, then the small wireless cell 102 determines that the second user UE2 is not permitted RIPA to the local network 106N via the small wireless cell 102. The RIPA Access Permission field may be considered "off" when the field is set to a value other than the value indicating that the second user UE2 is permitted to access the local network 106N. The RIPA Timeout field may be considered "off" if the field is set to a time duration, which has expired or a particular time in the past.

The RIPA permissions may be provided to the small wireless cell 102 at initialization or boot-up of the small wireless cell 102. Alternatively, the small wireless cell 102 may query and obtain the RIPA permissions for the second user UE2 in response to a request for RIPA from the second user UE2.

If the small wireless cell 102 determines that the second user UE2 is permitted RIPA to the local network 106N through the small wireless cell 102 at step 53110, then the small wireless cell 102 grants RIPA to the second user UE2 at step S3114.

Returning to step S3110, if the small wireless cell 102 determines that the second user UE2 is not permitted RIPA to the local network 106N through the small wireless cell 102, then the small wireless cell 102 denies RIPA to the second user UE2 at step S3112.

The small wireless cell 102 authorizes RIPA to the local network 106N by the second user UE2 for a time determined based on the information contained in the RIPA-Timeout field. If the RIPA-Timeout field includes an absolute time, then the second user UE2 is authorized RIPA to the local network 106N until the time identified in the RIPA-Timeout field is reached. Alternatively, if the RIPA-Timeout field includes a time interval or time period, then the second user UE2 is authorized RIPA to the local network 106N until the time period or time interval expires.

FIGS. 4A, 5A, 6A and 7A illustrate conventional ACLs and CSG lists, whereas FIGS. 4B, 5B, 6B and 7B illustrate example ACLs and CSG lists including access control information according to example embodiments.

FIG. 4A shows example content of a conventional ACL stored in a memory at a conventional small wireless cell.

As shown, the conventional ACL includes multiple fields defining access permissions for users A through X. In this example, the ACL shown in FIG. 4A may include general access permissions, in addition to other access parameters, such as a static IP address, time of day when access to a small wireless cell begins, and time of day when access to a small wireless cell ends.

FIG. 4B shows example content of an ACL including access control information stored in a memory at the small wireless cell 102 according to an example embodiment.

As shown, in addition to the fields shown in FIG. 4A, the ACL includes LIPA and RIPA permissions information. In this case, respective LIPA permission information is included in the LIPA Access Permission field and the LIPA Timeout field for each of the users A through X. Respective RIPA permission information is included in the RIPA Access Permission field and a RIPA Timeout field for each of the users A through X.

Figure 5A:
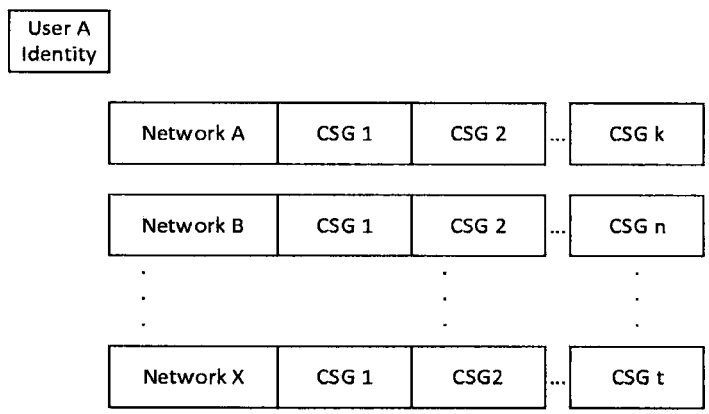
FIG. 5A shows example content of a conventional Closed Subscriber Group (CSG) list at a Home Location Register/Home Subscriber Server (HLR/HSS)

FIG. 5A shows example content of a conventional CSG list for a user at a Home Location Register/Home Subscriber Server (HLR/HSS).

Referring to FIG. 5A, the conventional CSG list includes networks and CSGs within the identified networks to which the user belongs.

Figure 5B:
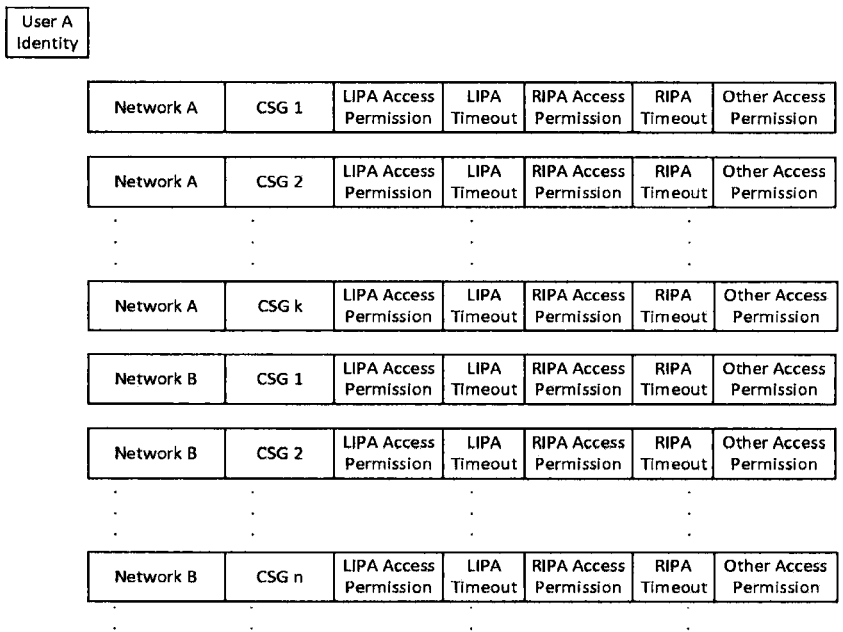
FIG. 5B shows example content of a CSG list at a Home Location Register/Home Subscriber Server (HLR/HSS) including access control information according to an example embodiment.

FIG. 5B shows example content of a CSG list for a user at a HLR/HSS including access control information according to an example embodiment. As shown, in addition to the fields shown in FIG. 5A, the CSG list includes LIPA and RIPA permission information for the user. The LIPA and RIPA permission information is the same as that described above with regard to FIG. 4B.

Figures 6A, 6B:
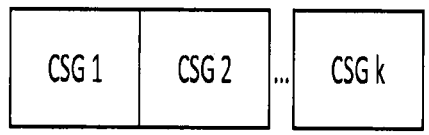
FIG. 6A shows example content of a conventional CSG list at a Mobile Management Entity/ Serving General Packet Radio Service Support Node/Visitor Location Register (MME/SGSN/VLR)
FIG. 6B shows example content of a CSG list at a MME/SGSN/VLR including access control information according to an example embodiment.

FIG. 6A shows example content of a conventional CSG list for a user at a Mobile Management Entity/Serving General Packet Radio Service Support Node/Visitor Location Register (MME/SGSN/VLR). As shown, the conventional CSG information includes only a list of CSGs for the user.

FIG. 6B shows example content of a CSG list for a user at a MME/SGSN/VLR including access control information according to an example embodiment. As shown, in addition to the CSG identification information shown in FIG. 6A, the CSG list includes LIPA and RIPA permission information for the user. The LIPA and RIPA permission information is the same as that described above with regard to FIG. 4B. The CSG list shown in FIG. 6B may also include other access permissions for the user such as, time of day when access to the small wireless cell 102 begins, and time of day when access to the small wireless cell 102 ends.

FIG. 7A shows example content of a conventional CSG list at a small wireless cell. As shown, the conventional CSG list includes only user identity information.

FIG. 7B shows example content of a CSG list at small wireless cell 102 according to an example embodiment. As shown, in addition to the user identity information shown in FIG. 7A, the CSG list shown in FIG. 7B includes LIPA and RIPA permission information for the user. The LIPA and RIPA permission information is the same as that described above with regard to FIG. 4B. The CSG list shown in FIG. 7B also includes other access permissions for the user such as, time of day when access to small wireless cell 102 begins, and time of day when access to small wireless cell 102 ends.

By adding the LIPA permission information and the RIPA permission information to the ACL and/or the CSG list, the small wireless cell 102 is capable of providing the LIPA and RIPA rights to users. As discussed herein, the LIPA permission information may also be referred to as LIPA control information, and the RIPA permission information may be referred to as RIPA control information.

According to at least some example embodiments, if a cluster of small wireless cells are deployed in an environment such as enterprise campus, all or substantially all of the small wireless cells may have similar characteristics. Accordingly, the same or substantially the same access control may be used. In this case, only one small wireless cell needs to host the ACL and all other small wireless cells may reuse the same ACL.

For CSG based access control, multiple small wireless cells may belong to the same CSG. Thus, the same CSG information may be reused by all small wireless cells.

The invention being thus described, it will be obvious that the same may be varied in many ways. Such variations are not to be regarded as a departure from the invention, and all such modifications are intended to be included within the scope of the invention.

We claim:

1. A method for controlling access to a local network through a small wireless cell in a wireless network, the method comprising:
   receiving, at the small wireless cell, an access control list for the small wireless cell, the access control list including a set of access control information for a user, the set of access control information including (i) local network access control information indicative of whether the user is permitted to access the local network through the small wireless cell, and (ii) wireless network access control information indicative of whether the user is permitted to access the wireless network, the local network access control information being different from the wireless network access control information, the local network access control information including a local network access permission field for the user, and the wireless network access control information comprising one of a closed subscriber group (CSG) identifier and an identifier for the user;
   first determining, by the small wireless cell, whether to permit the user to access the wireless network through the small wireless cell based on the wireless network access control information; and
   second determining, by the small wireless cell if the first determining determines that the user is permitted to access the wireless network through the small wireless cell, whether to permit the user to access the local network through the small wireless cell based on the local network access permission field for the user, wherein
      the access control list is one of a closed subscriber group (CSG) list and an access control list (ACL),
      the local network access control information is one of local Internet Protocol access (LIPA) control information and remote Internet Protocol access (RIPA) control information, and
      the local network access permission field is one of a LIPA permission field of the LIPA control information and a RIPA permission field of the RIPA control information.

2. The method of claim 1, wherein the user is served by the small wireless cell, and the local network access control information is indicative of whether the user is permitted to access at least one of the services and devices on the local network.

3. The method of claim 2, wherein the local network access control information is LIPA control information.

4. The method of claim 1, wherein the user is remotely connected to the small wireless cell via a macro cell, and the local network access control information is indicative of whether the user is permitted to access at least one of services and devices on the local network.

5. The method of claim 4, wherein the local network access control information associated with the user is RIPA control information.

6. The method of claim 1, wherein the access control list is received from at least one of a management system, an authentication, authorization and accounting server and another trusted network entity.

7. The method of claim 1, wherein the local network access control information for the user further includes access timeout information, the access timeout information being indicative of a length of time during which the user is permitted to access the local network.

8. A method for controlling access to a local network through a small wireless cell in a wireless network, the method comprising:
   first determining, at the small wireless cell, whether to permit a user to access the wireless network through the small wireless cell based on a first portion of access control information associated with the user, the first portion of the access control information including wireless network access control information indicative of whether the user is permitted to access the wireless network through the small wireless cell, the wireless network access control information comprising one of a closed subscriber group (CSG) identifier and an identifier for the user;
   second determining, at the small wireless cell, whether to permit the user to access the local network through the small wireless cell based on a second portion of the access control information associated with the user if the first determining determines that the user is permitted to access the wireless network through the small wireless cell, the second portion of the access control information being different from the first portion of the access control information, and including a local network access permission field for the user, the local network access permission field being indicative of whether the user is permitted to access the local network through the small wireless cell;
   first controlling access to the wireless network through the small wireless cell based on the first determining; and
   second controlling, at the small wireless cell, access to the local network by the user based on the second determining, wherein
      the access control information is included in one of a closed subscriber group (CSG) list and an access control list (ACL),
      the second portion of the access control information is one of local Internet Protocol access (LIPA) control information and remote Internet Protocol access (RIPA) control information, and
      the local network access permission field is one of a LIPA permission field of the LIPA control information and a RIPA permission field of the RIPA control information.

9. The method of claim 8, wherein the user is served by the small wireless cell, and the second determining determines whether to permit the user to access at least one of services and devices on the local network.

10. The method of claim 9, wherein the local network access control information is LIPA control information indicative of whether the user is permitted to access at least one of the services and devices on the local network.

11. The method of claim 8, wherein the user is permitted to access the wireless network, but denied local access to the small wireless cell, if the second determining determines that the user is not permitted to access the local network.

12. The method of claim 8, wherein:
the first controlling includes,
permitting the user to access the wireless network via the small wireless cell; and
the second controlling includes,
denying the user access to the local network if the second determining determines that the user is not permitted to access the local network.

13. The method of claim 8, wherein:
the first controlling includes,
permitting the user to access the wireless network via the small wireless cell; and
the second controlling includes,
permitting the user access to the local network cell if the second determining determines that the user is permitted to access the local network.

14. The method of claim 8, wherein:
the first controlling includes,
denying the user access to the wireless network if the first determining determines that the user is not permitted to access the wireless network; and
the second controlling includes,
denying the user access to the local network if the first determining determines that the user is not permitted to access the wireless network.

15. A method for controlling access to a local network through a small wireless cell in a wireless network, the method comprising:
separately controlling, at the small wireless cell, user access to the local network and the wireless network through the small wireless cell based on a set of access control information for the user, the set of access control information being included in an access control list, and the set of access control information including (i) local network access control information indicative of whether the user is permitted to access the local network through the small wireless cell, and (ii) wireless network access control information indicative of whether the user is permitted to access the wireless network through the small wireless cell, the local network access control information being different from the wireless network access control information, the local network access control information including a local network access permission field for the user, and the wireless network access control information comprising one of a closed subscriber group (CSG) identifier and an identifier for the user;
wherein the separately controlling includes,
first determining whether to permit the user to access the wireless network through the small wireless cell based on the wireless network access control information, and
second determining whether to permit the user to access the local network through the small wireless cell based on the local network access permission field for the user if the first determining determines that the user is permitted to access the wireless network through the small wireless cell;
wherein the access control list is one of a closed subscriber group (CSG) list and an access control list (ACL);

wherein the local network access control information is one of local Internet Protocol access (LIPA) control information and remote Internet Protocol access (RIPA) control information; and
wherein the local network access permission field is one of a LIPA permission field of the LIPA control information and a RIPA permission field of the RIPA control information.

16. The method of claim 15, wherein the user is remotely connected to the small wireless cell via a macro cell, and the local network access control information is indicative of whether the user is permitted to access at least one of services and devices on the local network.

17. The method of claim 16, wherein the local network access control information associated with the user is RIPA control information.

18. A base station of a small wireless cell in a wireless network, the base station of the small wireless cell being configured to:
receive an access control list for the base station of the small wireless cell, the access control list including a set of access control information for a user, the set of access control information including (i) local network access control information indicative of whether the user is permitted to access a local network through the base station of the small wireless cell, and (ii) wireless network access control information indicative of whether the user is permitted to access the wireless network through the base station of the small wireless cell, the local network access control information being different from the wireless network access control information, the local network access control information including a local network access permission field for the user, and the wireless network access control information comprising one of a closed subscriber group (CSG) identifier and an identifier for the user:
determine whether to permit the user to access the wireless network through the base station of the small wireless cell based on the wireless network access control information: and
determine whether to permit the user to access the local network through the base station of the small wireless cell based on the local network access permission field for the user if the base station of the small wireless cell determines that the user is permitted to access the wireless network through the base station of the small wireless cell, wherein
the access control list is one of a closed subscriber group (CSG) list and an access control list (ACL),
the local network access control information is one of local Internet Protocol access (LIPA) control information and remote Internet Protocol access (RIPA) control information, and
the local network access permission field is one of a LIPA permission field of the LIPA control information and a RIPA permission field of the RIPA control information.

19. A base station of a small wireless cell in a wireless network, the base station of the small wireless cell being configured to:
separately control user access to a local network and a wireless network through the base station of the small wireless cell based on a set of access control information for the user, the set of access control information for the user being included in an access control list, and the set of access control information including (i) local network access control information indicative of whether the user is permitted to access the local network through the base station of the small wireless, and (ii) wireless network access control information indicative of whether the user is permitted to access the wireless network through the base station of the small wireless, the local network access control information being different from the wireless network access control information, the local network access control information including a local network access permission field for the user, and the wireless network access control information comprising one of a closed subscriber group (CSG) identifier and an identifier for the user;

wherein the base station of the small wireless is configured to separately control user access to the wireless network and the local network through the base station of the small wireless by first determining whether to permit the user to access the wireless network through the base station of the small wireless based on the wireless network access control information, and second determining whether to permit the user to access the local network through the base station of the small wireless based on the local network access permission field for the user if the first determining determines that the user is permitted to access the wireless network through the base station of the small wireless;

wherein the access control list is one of a closed subscriber group (CSG) list and an access control list (ACL);

wherein the local network access control information is one of local Internet Protocol access (LIPA) control information and remote Internet Protocol access (RIPA) control information; and wherein the local network access permission field is one of a LIPA permission field of the LIPA control information and a RIPA permission field of the RIPA control information.

* * * * *